US006931144B2

(12) United States Patent
Perrier

(10) Patent No.: US 6,931,144 B2
(45) Date of Patent: Aug. 16, 2005

(54) AUTOMATED RIP TIDE DETECTION SYSTEM

(76) Inventor: Gregory Perrier, 280 Half Hollow Rd., Dix Hills, NY (US) 11746

( * ) Notice: Subject to any disclaimer, the term of this patent is extended or adjusted under 35 U.S.C. 154(b) by 877 days.

(21) Appl. No.: 09/872,031

(22) Filed: Jun. 1, 2001

(65) Prior Publication Data

US 2005/0031198 A1 Feb. 10, 2005

(51) Int. Cl.[7] ................................................. G06K 9/00
(52) U.S. Cl. ........................ 382/100; 382/165; 348/155
(58) Field of Search ................................ 382/100, 103, 382/106, 107, 108, 111, 120, 123, 154, 159, 162, 164, 165, 169, 177, 181, 191, 203, 207, 209, 220, 237, 243, 250, 260, 274, 280, 285, 295, 305, 316; 380/217; 370/436; 348/31, 155; 702/2; 342/357.13; 345/419; 366/127; 181/294; 701/16; 114/125

(56) References Cited

U.S. PATENT DOCUMENTS

| | | | | | |
|---|---|---|---|---|---|
| 5,034,810 | A | * | 7/1991 | Keeler | 348/31 |
| 6,064,924 | A | * | 5/2000 | Fleischmann | 701/16 |
| 6,105,527 | A | * | 8/2000 | Lochtefeld et al. | 114/125 |
| 6,311,130 | B1 | * | 10/2001 | Huang | 702/2 |
| 6,445,409 | B1 | * | 9/2002 | Ito et al. | 348/155 |
| 6,469,664 | B1 | * | 10/2002 | Michaelson et al. | 342/357.13 |
| 6,702,063 | B1 | * | 3/2004 | Yamaguchi et al. | 181/294 |
| 6,719,449 | B1 | * | 4/2004 | Laugharn et al. | 366/127 |
| 6,731,278 | B2 | * | 5/2004 | Yokoyama et al. | 345/419 |
| 6,847,737 | B1 | * | 1/2005 | Kouri et al. | 382/260 |

OTHER PUBLICATIONS

Rip Currents: A Field Experiment and Numerical Model, Dept. of Navy Postgraduate School; 2000, 12 pgs.
"Kidnapers beware: New Software can nab you" *Machine Design*, vol. 73, No. 9, May 3, 2001, p. 48.
"Face Identifier uses neural networks" *E. Magazine*, May 2001 p. 90oc.nps.navy website (2000). the Australian data referenced in this doc is dated 1985.
UF Research: "Rip Currents May Hang Around for Weeks, Months", UF News; napa.ufl website (2000).
"What is a Rip Current?", National Weather Service, 1 page pamphlet, 2000.
"Rip Currents", WFO Wilmington, National Weather Service Forecast Office, 2000, 4 pages.
"Rip Currents", USLA Lifeguards For Life; USLA website (2004) 3 pages.

* cited by examiner

*Primary Examiner*—Rhavesh M. Mehta
*Assistant Examiner*—Seyed Azarian
(74) *Attorney, Agent, or Firm*—Alfred M. Walker

(57) ABSTRACT

A system substitutes digitized camera images for human vision, in determining the presence or absence of rip tides among sea water wave patterns at a public swimming beach. Computer analysis of these images involves image pre-filtering that enhances the telltale signs of rip tides, before the digital data is processed for classification as NORMAL or RIP TIDE. The classification itself can proceed along by expert systems which mimic the manner in which a human observer performs the detection; or by building a neural network, that determines its own classification criteria for identifying rip tides.

21 Claims, 7 Drawing Sheets

AUTOMATED RIP TIDE DETECTION SYSTEM

FIELD OF THE INVENTION

The present invention relates to the field of water safety at public swimming beaches.

BACKGROUND OF THE INVENTION

Lifeguards warn people about rip tides at public swimming beaches, such as along ocean beaches. Based upon experience they are trained to visually spot rip tide flows, since rip tides have three basic characteristics that are different from normal waves.

First, rip tide wave patterns are perpendicular to the shore, which is why they rush out to sea so fast and endanger swimmers caught within the pulling power of the rip tide. In contrast, normal ocean waves strike the shore obliquely, and this cushions their impact. Therefore normal ocean waves bounce off the sand at an opposite oblique angle in a flow rate that is rather slow. Lifeguards are trained to spot rip tide water flows going back perpendicular to the shore, as opposed to the oblique configuration of normal ocean beach waves.

Second, the coloration is different. Rip tide waters are generally darker than normal waters.

Third, rip tides may have more surface ripples and texturing.

Related art in non-analogous fields include "Kidnappers beware! New software can nab you", *Machine Design*, May 3, 2001 issue, page 48, wherein there is discussed a computerized system which mimics human analysis of handwriting samples; using recognizable features such as shapes and spaces. Furthermore, in "Face identifier uses neural network", *Laser Focus World*, May, 2001 issue, page 90, a system is described for training a computer with many examples of images of faces entered into the system with a digital camera, to assist the computer in identifying specific human faces.

However, it is not known to use computer analysis of common ocean rip tide characteristics to predict the presence of an ocean rip tide.

OBJECTS OF THE INVENTION

It is therefore an object of the present invention to assist experienced lifeguards in detecting rip tides in their vicinity by computerized image analysis of a number of telltale traits, to differentiate rip tides from normal ocean waves It is also an object of the present invention to utilize video camera images to supplement human vision in spotting rip tides.

It is yet another object of the present invention to analyze computer-generated images to detect the presence of rip tides.

It is a further object of the present invention to provide a computerized video detector for rip tides which mimics the manner in which a human observer would perform the detection.

It is also an object of the present invention to provide a surveillance of a shore swimming area by a video camera for detecting rip tides.

SUMMARY OF THE INVENTION

In keeping with these objects and others which may become apparent, the present invention includes a system to assist lifeguards in detecting rip tides at an ocean beach, by visually capturing and analyzing common repetitive features of rip tides. For example, rip tide waves are different from normal ocean waves because rip tides strike the shore in a generally perpendicular fashion and bounce back sharply, as opposed to normal waves, which contact the beach shore at a slanted angle and return after dissipating much energy.

The system also detects rip tide waters which may be darker and which may have more surface texture, such as ripples, than surrounding water.

In the present invention, camera images are substituted for human vision, and computer analysis of these images is used to detect the presence of rip tides. The analysis involves some image pre-filtering that enhances the telltale signs of rip tides.

In one embodiment, the computer analysis of the system utilizes expert systems of analysis, which mimic how a human observer would perform the detection.

Alternatively, in another embodiment, the computer analysis of the system utilizes a neural network, which trains the system with many examples of images of common rip tide patterns, and then allows the network to decide whether a digitally captured image of a wave pattern is a rip tide wave or a common wave.

BRIEF DESCRIPTION OF THE DRAWINGS

The present invention can best be understood in conjunction with the accompanying drawings, in which.

DETAILED DESCRIPTION OF THE INVENTION

It is well known that experienced lifeguards can detect rip tides in their vicinity by a number of telltale traits. They differentiate rip tides from normal ocean waves because rip tides strike the shore directly and bounce back sharply, as opposed to normal waves which hit the shore obliquely and dissipate their energy before bouncing back. Also, rip tide waters may be darker and may have more surface texture than surrounding water.

In this invention, camera images are substituted for human vision, and computer analysis of these images is used to detect the presence of rip tides. The analysis involves some image pre-filtering that enhances the telltale signs of rip tides before the digital data is processed for classification as NORMAL or RIP TIDE. The classification itself can proceed along either of two lines.

One well known method is expert systems which mimic the manner in which a human observer would perform the detection. The subtle rules used by a human are codified and used as the basis for classification software. The *Machine Design* publication reference noted above relates to such an approach to determining authorship of handwritten documents by a program written at the University of Buffalo. Like an expert handwriting analyst, the software extracts features such as individual character shapes, descenders, and spaces between the lines and words.

A second well known method is to build a neural network, train it with many examples of images with known classification, and then let the network determine its own classification criteria. In practice, most neural networks are simulated in software on digital computers such as PC's. The *Laser Focus World* publication reference noted above relates to such a system at the University of Tsukuba that uses neural networks to distinguish images of faces which are entered into the system using a digital camera.

Figure 1:
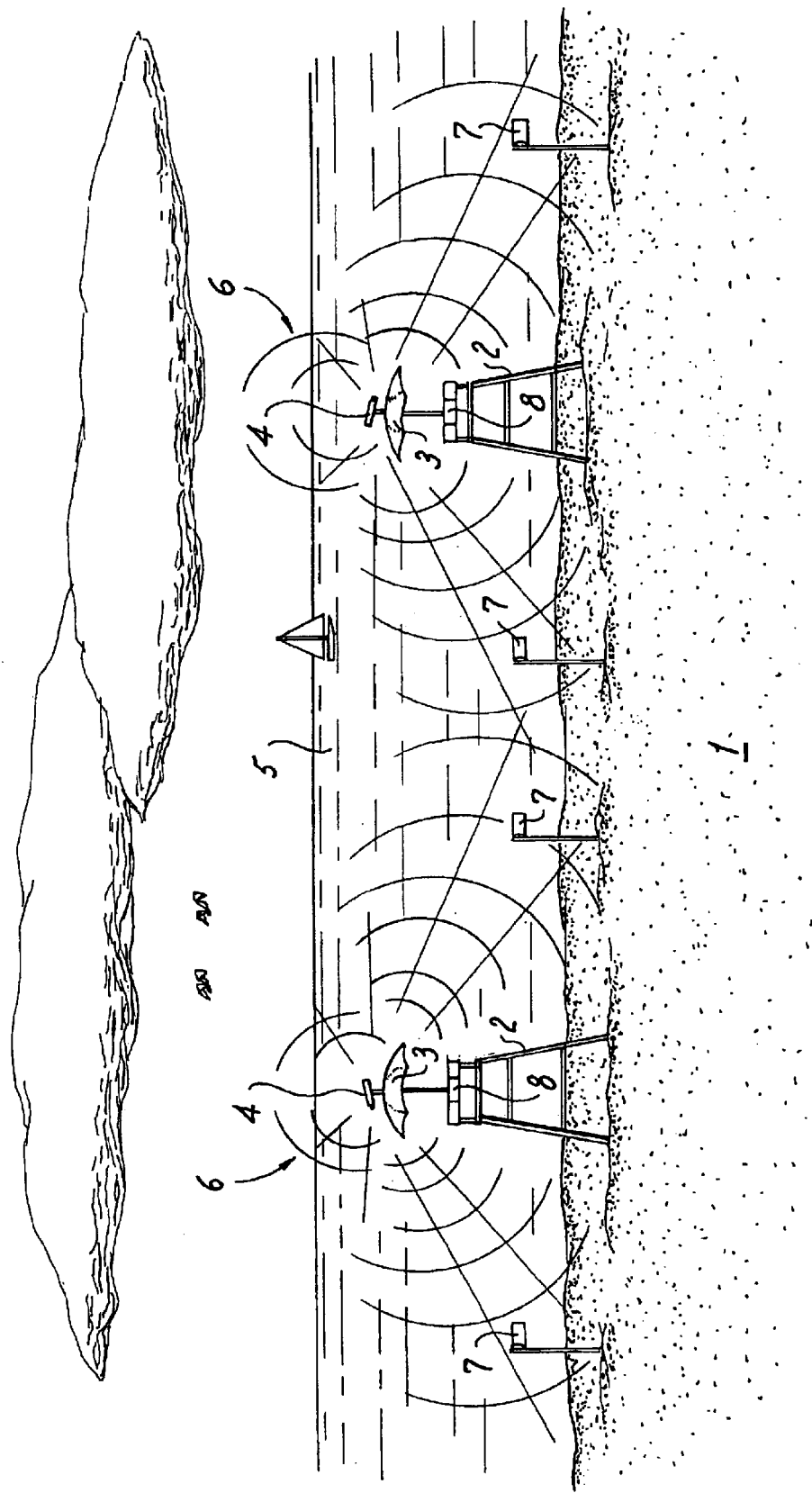
FIG. 1 is a front elevational view of a beach scene with one embodiment of the system of this invention.

FIG. 1 shows a beach scene with beach sand 1, ocean 5, lifeguard perches 2, umbrellas 3, and warning flags 7. The system of this invention is housed in an enclosure 8 with the assistance of camera 4 atop the umbrellas 3. The area under surveillance by each camera is schematically depicted by rays 6.

Figure 2:
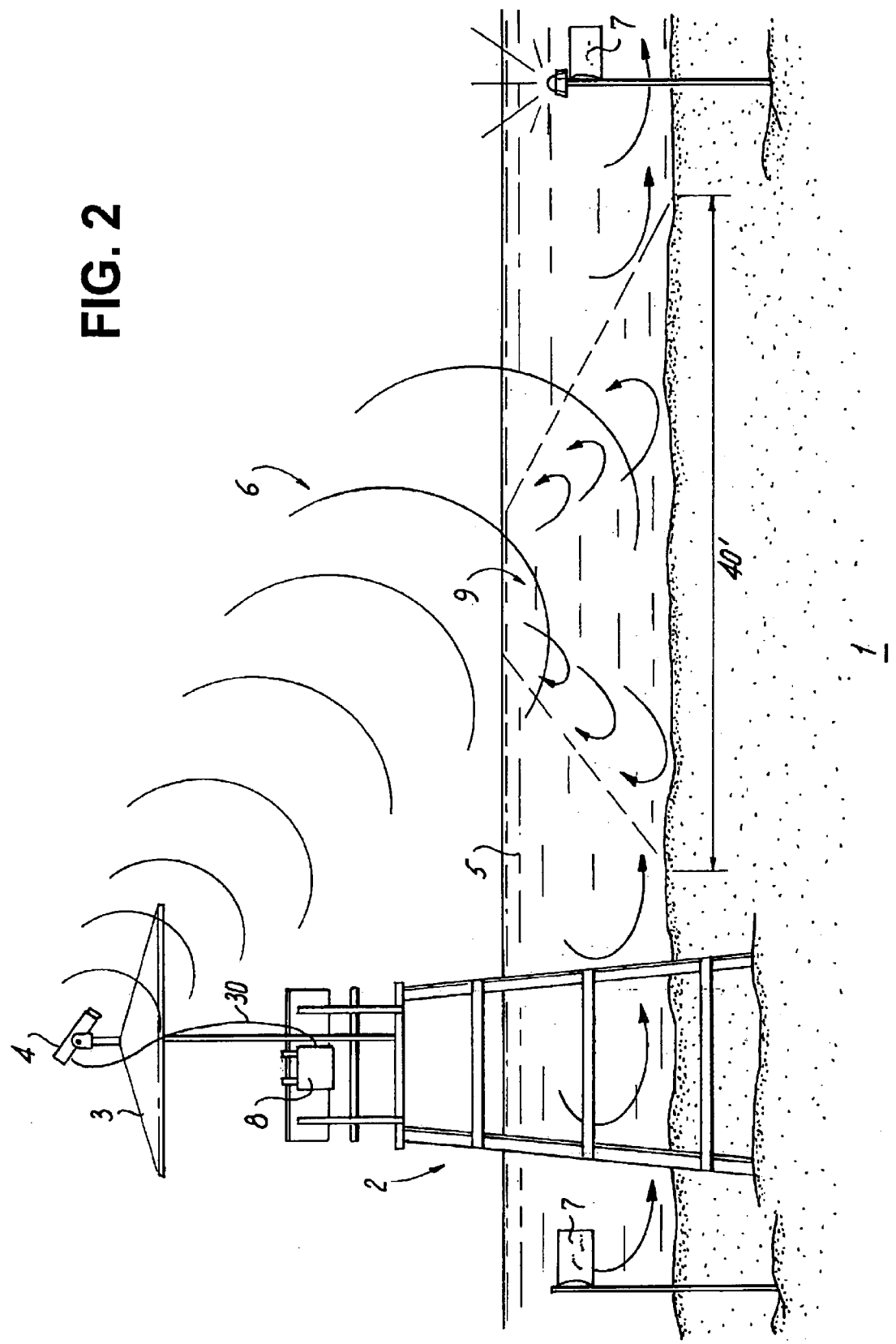
FIG. 2 is a front elevational view of a beach scene in close-up, illustrating a rip tide under surveillance by the system of this invention.

FIG. 2 is a close-up also depicting a rip tide area 9 which is about 40 feet wide at the shore line.

Figure 3:
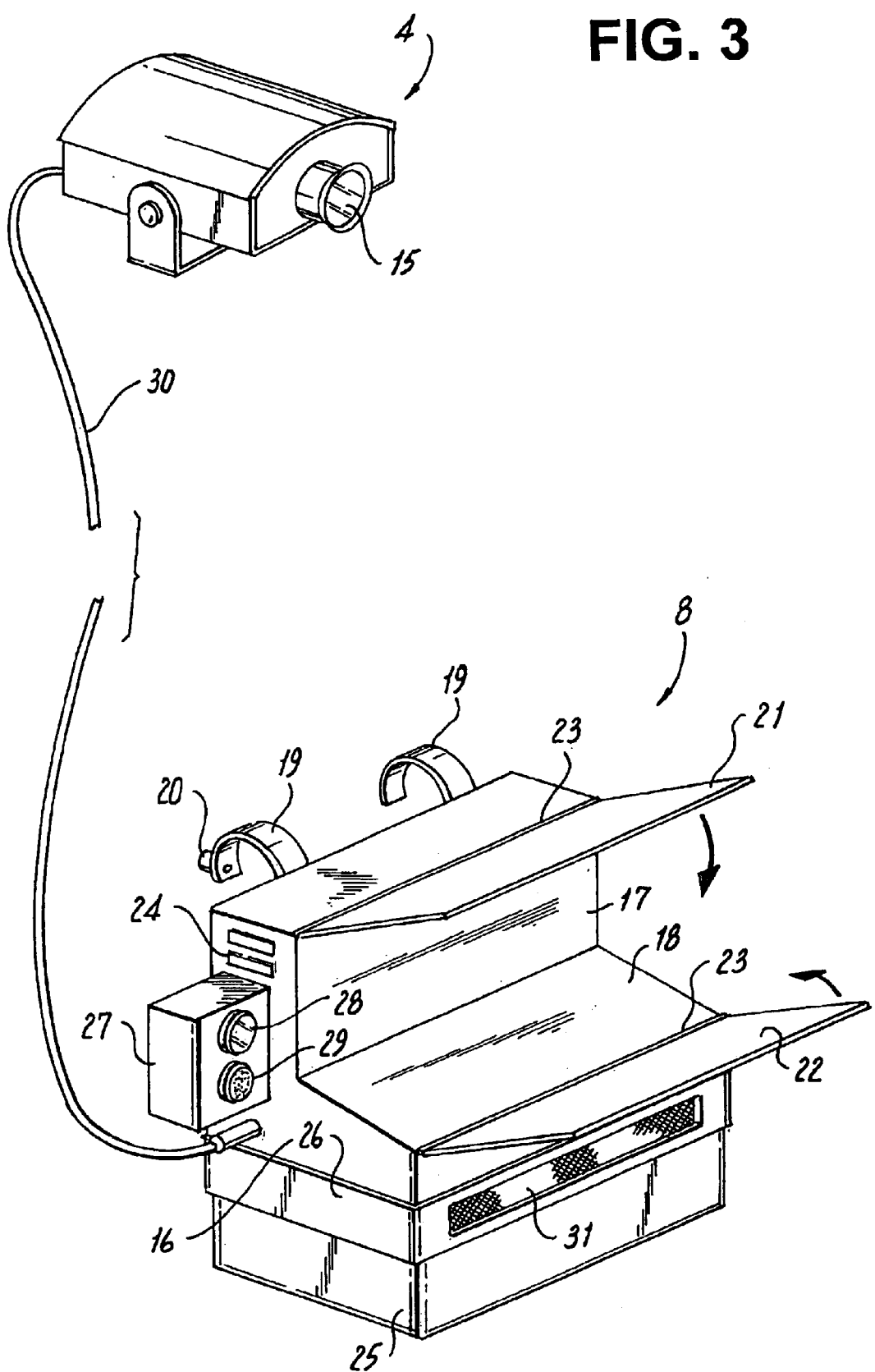
FIG. 3 is a perspective view of the video and surveillance hardware of this invention.

The physical hardware is shown in FIG. 3. A camera 4 in a weatherproof enclosure is shown with wide angle lens 15. It is connected via cable 30 to a laptop computer within weatherproof enclosure 16 with transparent glazed display panel 17 (glass or polycarbonate) and transparent waterproof flexible cover 18 over the keyboard. This affords full operation for system checkout and start-up. When not needed for manual interaction, the laptop computer is further protected with reflective panels 21 and 22 which are rotated in place over panel 17 and cover 18 using high friction piano hinges 23.

Although a commercially available laptop computer is used, it is modified to accept external cooling via direct impingement from fan tray 26 which obtains its inlet air through replaceable filter 31 and exhausts heated air through outlet louvers 24.

A large capacity external battery module 25 is also used to power the entire system. In operation, a freshly charged battery is exchanged with the depleted one every morning at the start of the surveillance shift. Attachment brackets 19 with key lock retainer 20 provide easy attachment to the life guard perch 2. An annunciator module 27 contains a bright red flashing warning light with strobe 28 and an audio amplifier with loudspeaker 29.

Figure 4:
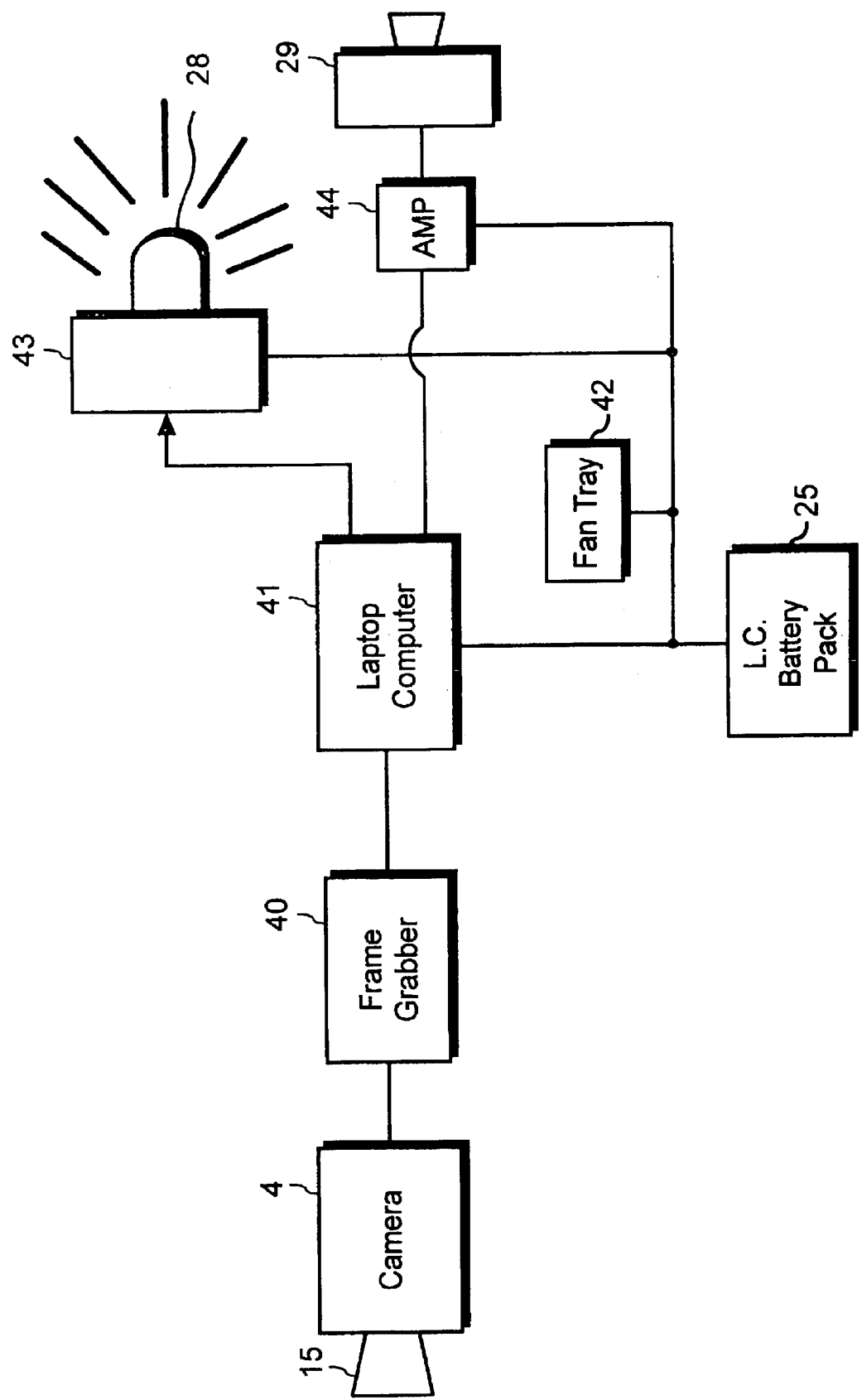
FIG. 4 is a hardware block diagram thereof.

FIG. 4 is a block diagram of the hardware of this invention. Camera module 4 can be implemented as a surveillance type CCD video camera such as National Electronics model NL6124 with 480 lines of resolution in a weatherproof enclosure such as Sepco model VCH-100. Both of these units can be obtained from Allied Electronics of Fort Worth, Tex. Such a camera requires a frame grabber 40 board to sample and digitize individual video frames of data.

An alternative is to use a high resolution megapixel camera such as a model CV-M7 which is available from JAI America of Laguna Hills, Calif. This has a native digital interface which dispenses with the need for an external frame grabber 40; it is connected directly to laptop computer 41 via a Universal Serial Bus (USB) or Firewire interface.

Laptop computer 41 can be any one of a wide variety of powerful commercially available types such as a Compaq series 1800 featuring an Intel Pentium III processor module. Large capacity battery module 25 supplies power to camera 4, laptop 41, fan tray 42, visual annunciator module 43, and audio power amplifier 44. Laptop computer 41 has on/off control over visual module 43 and provides the audio alarm or vocal message to audio amplifier 44.

While a laptop computer is preferable, standard desktop computers (not shown) may be utilized by remote wireless or cable connections to the camera module 4.

Figure 5:
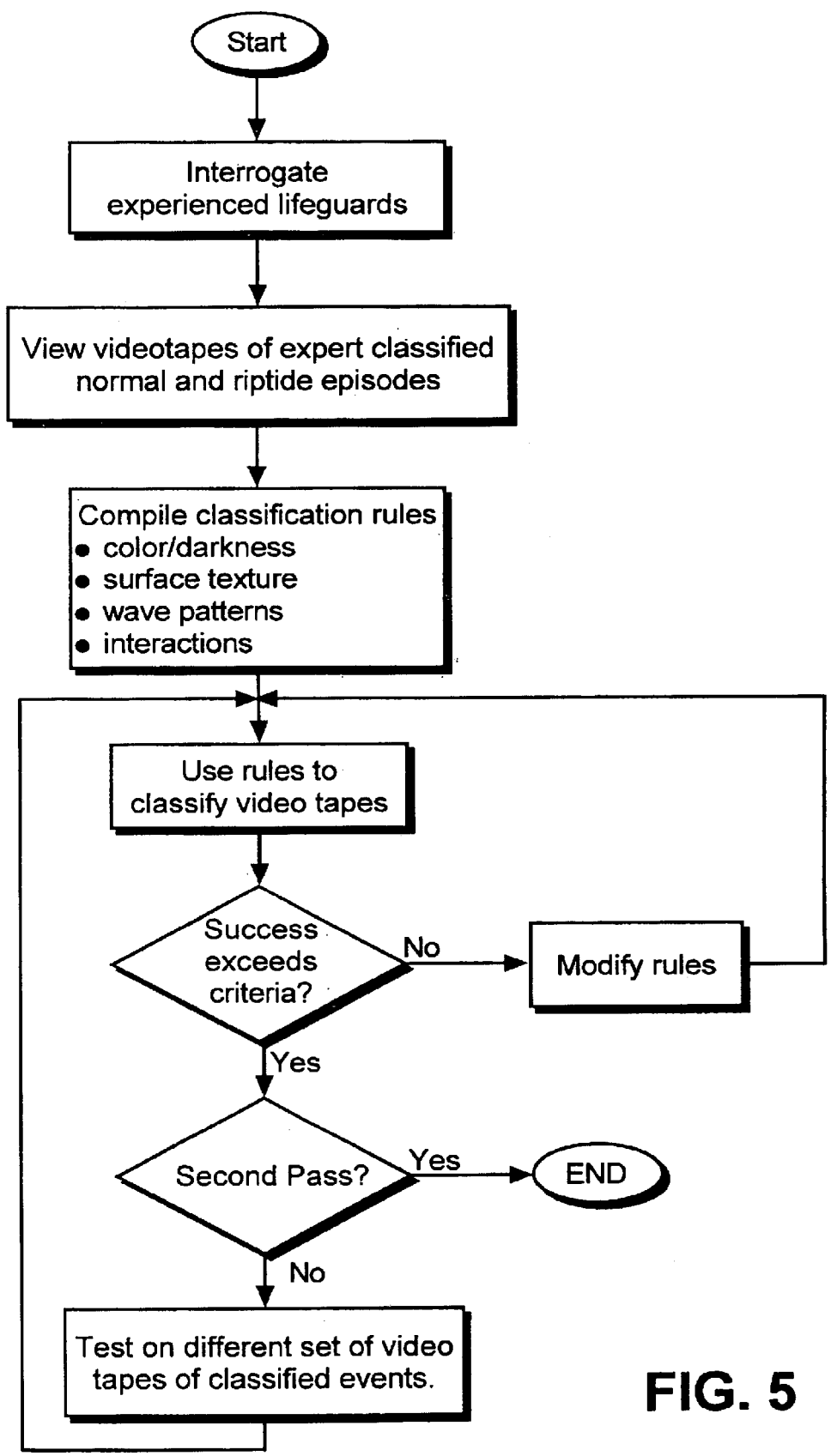
FIG. 5 is a flowchart of the construction of one embodiment of the present invention utilizing an expert system of analysis.

FIG. 5 outlines the procedure to construct an expert system in software to detect rip tides. A first step is to interrogate one or more experienced life guards or oceanographers and have them classify live situations which are simultaneously video taped. Further discussions of distinguishing clues from the video tapes enables the compilation of classification rules for detecting rip tide episodes.

For example, color or darkness, surface texture, wave patterns, and interactions of these characteristics are all elements which enter into the rules defined. The actual visual image is subjected to a number of pre filters to highlight each of the characteristics of interest. Each filter can define a "layer" outlining spatially different characteristics. Brightness mapping or color mapping is of use. Fast Fourier Transform (FFT) analysis creates another layer outlining areas of enhanced surface texture. Duration or sustainability of these features as well as registration of regions on the different layers are other factors manipulated by the rules defined. While normally it may be considered to be too high a computation task for a lap top computer, but it must be realized that a frame rate of about at least three per second is all that is required for this analysis. Also, the analysis may not be continuous. There can be breaks in the actual frame sampling, if necessary, to permit the computer to catch up with computations of a series of consecutive frames.

After the rules are initially compiled, they are used to classify the video tapes as if they were live camera surveillance frames. If the accuracy of classification is not up to pre-established standards (both false negative and false positive rates), the rules are modified and refined in an iterative manner. Testing on a second batch of tapes not used in defining the rules is the last step. Once this process is finished, software for both the pre-filters as well as the rules is now available and can be replicated and deployed to each system of this invention to perform live beach surveillance of rip tide episodes.

Figure 6:
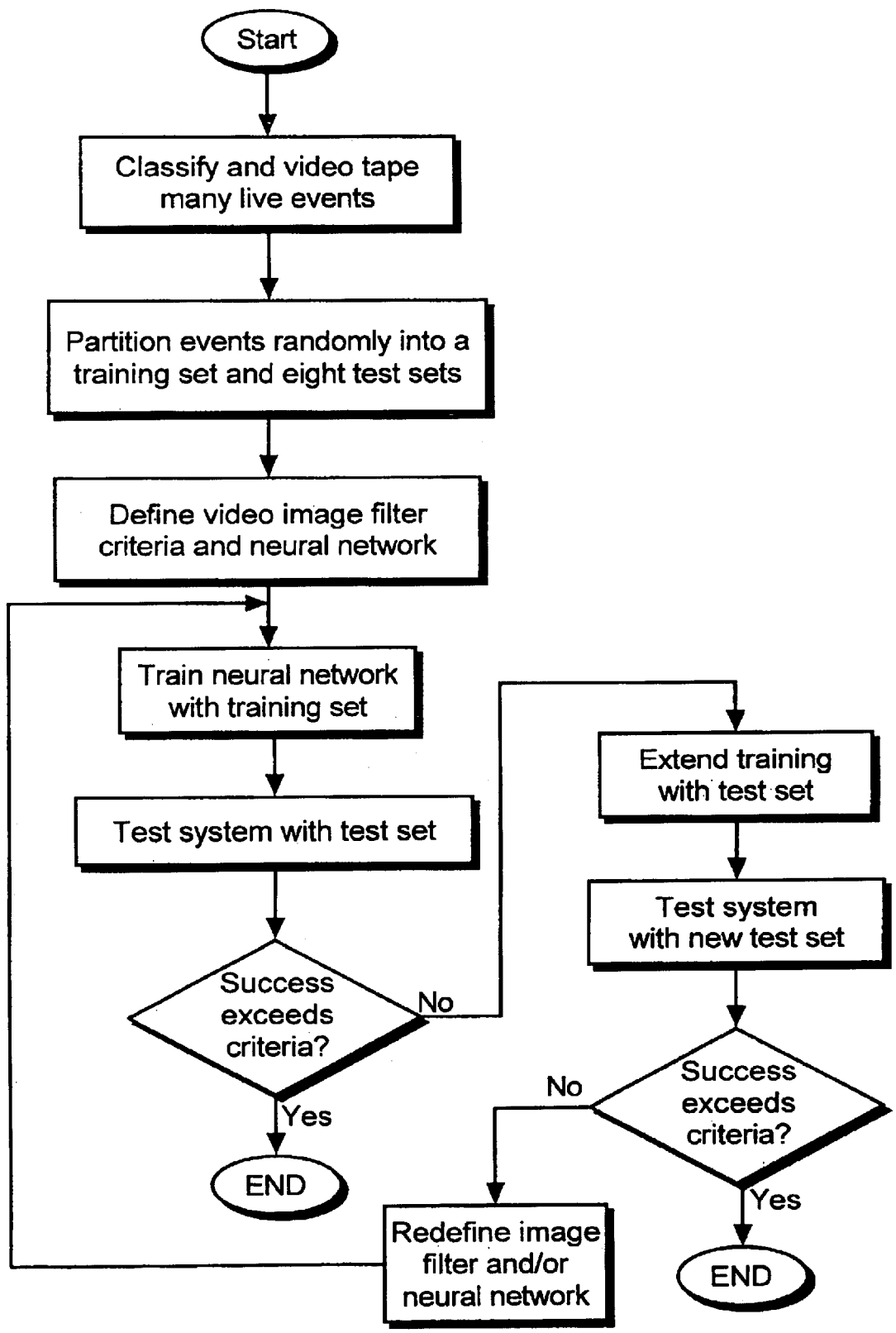
FIG. 6 is a flowchart of the construction of a another embodiment of the present invention utilizing neural network of analysis; and, FIG. 7 is a flowchart of a rip tide detection using the present invention.

In an alternative embodiment of this invention, as shown in FIG. 6, a neural network approach is taken. The first step is similar to that in the expert system construction. Many live video tape snippets are recorded and classified by live experts. These should be rip tide as well as a wide variety of non rip tide conditions. These snippets are randomly assigned to three sets, a training set and a plurality of test sets, preferably two test sets. Using knowledge of neural networks as well as the task at hand, the neural network is configured along with any pre filtering of the video imaging. This network is simulated using digital code which simulates neural networks.

In the *Laser Focus World* publication reference noted above, a self organizing map (SOM) was the type of network used for identifying human faces. A similar technique may or may not be applicable. The network is trained by the training set and then used to classify the first test set. If the pre-established criteria is met or exceeded, the task is finished. Otherwise more training is done with the first test set and then the network is tested with a second test set. If criteria is still not met or exceeded, the image filters and/or neural network are modified in an iterative manner until criteria is met. At this point, software for both the neural net and pre filters is available for replication and deployment to field units.

Figure 7:
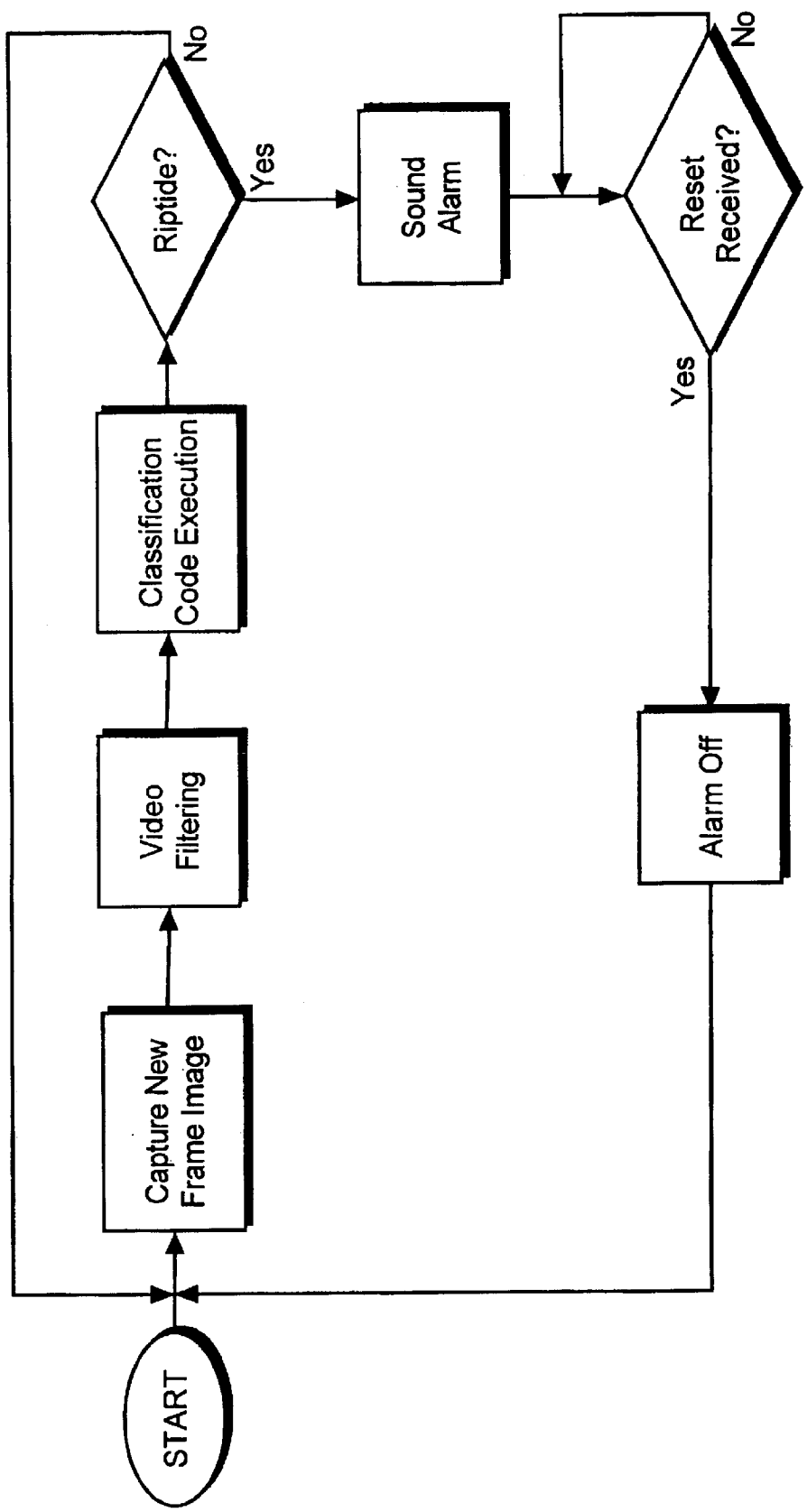

FIG. 7 is a flowchart of rip tide detection using software constructed either as an expert system or as a neural network. At this level of detail, the operational flow chart is identical. A new frame image from the camera is captured by the system. This is fed into the pre filter software. The classification code uses the new filtered frame data as well as previously captured frame data to make a determination of the current conditions in the water; i.e., "Has a riptide been detected?" If it has not, the system simply proceeds to acquire the next frame image. If a rip tide situation has been detected, the alarm is deployed. While a single alarm may be used, preferably the alarm is sounded in both a visual and audio manner (siren and/or voice announcement) until a manual reset is detected. At this time, the alarm is turned off the present invention, in conjunction with the scope of the invention, as noted in the appended claims.

I claim:

1. A system for detecting rip tides in the vicinity of a seashore by identifying a number of telltale traits, wherein rip tides strike the shore directly and bounce back sharply as opposed to normal waves which hit the shore obliquely and dissipate their energy before bouncing back, and wherein rip tide waters have different color characteristics than normal seashore waves, and have a different surface texture than normal seashore waves; said system comprising:

a camera providing video images;

a computer analyzing said images to detect the presence of rip tides, said analysis involving image pre-filtering enhancing the telltale signs of typical rip tides, and converting said images into digital data processed for classification as NORMAL or RIP TIDE.

2. The system as in claim 1 wherein said computer analysis utilizes an expert systems mimicking a manner in which a human observer visually performs rip tide detection, said system codifying rules used by a human; said system extracting oceanographic visual features of rip tides and determining whether an observed wave pattern is NORMAL OR RIPTIDE.

3. The system as in claim 1 wherein said computer analysis builds a neural network by training said system with many examples of images with known classifications of rip tides, said neural network system determining its own classification criteria, said neural network system distinguishing images of rip tides from normal wave patterns.

4. The system as in claim 1 wherein said system and said camera are enclosed within a weather-proof enclosure.

5. The system as in claim 4 wherein said camera includes a wide angle lens.

6. The system as in claim 1 wherein said camera is connected via a cable to a computer.

7. The system as in claim 4 wherein said computer is enclosed within a weatherproof enclosure with a transparent glazed display panel and a transparent waterproof flexible cover over a keyboard for inputting data to said computer.

8. The system as in claim 7 wherein said computer accepts external cooling via direct impingement from a fan, which said fan inputs inlet air through a filter and exhausts heated air through at least one exhaust outlet.

9. The system as in claim 1 wherein said system is powered by an external battery module.

10. The system as in claim 1 further comprising lockable attachment brackets attaching said computer to a life guard perch stand.

11. The system as in claim 1 further comprising an annunciator module lighting a warning light and an audio amplifier with loudspeaker warning of the presence of a rip tide.

12. The system as in claim 1 wherein said camera is a surveillance type video camera.

13. The system as in claim 12 wherein said camera is a high resolution megapixel camera, having a native digital interface dispensing with the need for an external frame grabber, said camera connected directly to said computer via an interface.

14. The system as in claim 1 wherein said computer is a laptop computer.

15. The system as in claim 14 wherein said laptop computer has an on/off control over a visual module and provides an audio alarm to an audio amplifier.

16. The system as in claim 2 wherein live video taped images of rip tide wave patterns are inputted and classified, said system having predetermined visual clues enabling compilation of classification rules for detecting rip tides, including color or darkness, surface texture, wave patterns, and interactions of these characteristics, said visual characteristics entered into said defined rules; said system subjecting actual visual images to a number of pre filters to highlight each of said rip tide characteristics, each said filter defining a layer outlining spatially different characteristics; said system utilizing Fast Fourier Transform (FFT) analysis to create another layer outlining areas of enhanced surface texture, duration and sustainability of said characteristics as well as registration of spatial regions defining said characteristics of an image of a rip tide.

17. The system in claim 16 wherein said computer utilizes a camera frame rate of about three per second.

18. The system in claim 17 wherein said breaks in actual frame sampling are provided to permit said computer to catch up with computations of a series of consecutive frames.

19. The system as in claim 17 wherein said rules are modified and refined over time.

20. The system as in claim 3 wherein a plurality of live video tape snippets are recorded and classified, including a plurality of rip tide as well as a plurality of non rip tide conditions, said system randomly assigning said snippets to a training set and a plurality of test sets, said system configuring along with pre filtering of said video imaging, said neural network being simulated using digital code, said system having a self organizing map (SOM) for identifying rip tide locations.

21. The system as in claim 1 wherein said computer obtains frame images from said camera and feeds said frame images into pre filter software, said system utilizing a classification code using new filtered frame data and previously captured frame data to make a determination of the current conditions in the water, and ascertaining whether a riptide been detected, and if not, said system proceeding to acquire a next frame image, and if a rip tide situation has been detected, said system sounding said alarm until a manual reset is detected, and said system having a deployment trigger turning off said alarm and continuing visual surveillance of potential rip tide waters.

* * * * *